United States Patent [19]
Raith et al.

[11] Patent Number: 5,806,007
[45] Date of Patent: Sep. 8, 1998

[54] ACTIVITY CONTROL FOR A MOBILE STATION IN A WIRELESS COMMUNICATION SYSTEM

[75] Inventors: Alex Krister Raith, Durham, N.C.; Lars Bilström, Solna, Sweden; John Diachina, Garner; Raymond C. Henry, Wake Forrest, both of N.C.; Karl-Erik Andersson, Stockholm, Sweden

[73] Assignee: Telefonaktiebolaget LM Ericsson, Stockholm, Sweden

[21] Appl. No.: 544,838

[22] Filed: Oct. 18, 1995

[51] Int. Cl.⁶ .................................................. H04B 1/38
[52] U.S. Cl. ........................................ 455/574; 455/38.3
[58] Field of Search .................................. 455/38.3, 343, 455/33.1, 54.1, 572–574, 127; 379/59; 370/311

[56] References Cited

U.S. PATENT DOCUMENTS

| | | | |
|---|---|---|---|
| 4,887,265 | 12/1989 | Felix | 370/333 |
| 4,916,691 | 4/1990 | Goodman | 370/389 |
| 5,175,867 | 12/1992 | Wejke et al. | 455/439 |
| 5,353,332 | 10/1994 | Raith et al. | 455/455 |
| 5,491,718 | 2/1996 | Gould et al. | 375/205 |
| 5,535,207 | 7/1996 | Dupont | 455/38.3 X |
| 5,541,976 | 7/1996 | Ghisler | 455/343 X |
| 5,560,021 | 9/1996 | Vook et al. | 395/750 |
| 5,570,369 | 10/1996 | Jokinen | 455/38.3 X |
| 5,590,396 | 12/1996 | Henry | 455/38.3 X |

FOREIGN PATENT DOCUMENTS

| | | |
|---|---|---|
| 615364 | 9/1994 | European Pat. Off. . |
| 269630 | 11/1988 | Japan . |
| 13089 | 6/1994 | WIPO . |
| 16330 | 6/1995 | WIPO . |

OTHER PUBLICATIONS

"Cellular System Dual–Mode Mobile Station –Base Station Compatibility Standard", *EIA/TIA Interim Standard, IS–54–B,* pertenent pages only, Apr. 1992.

K. Felix, "Packet Switching in Digital Cellular Systems", *Proc. 38th IEEE Vehicular Technology Conf,* pp. 414–418, Jun. 1988.

P. Decker et al., "A General Packet Radio Service Proposed for GSM", *GSM in a Future Competitive Environment,* Helsinki, Finland, pp. 1–20, Oct. 13, 1993.

P. Decker, "Packet Radio in GSM", *European Telecommunications Standards Institute (ETSI),* T Doc SMG 4 58/93, pp. 1–13 (odd pages only), Feb. 12, 1993.

J. Hämäläinen et al., "Packet Data Over GSM Network", T Doc SMG 1 238/93, *ETSI,* pp 1–8, Sep. 28, 1993.

International Search Report re PCT/US96/16685 Date of mailing: 5 Mar. 1997.

Primary Examiner—Thomas J. Mullen, Jr.
Attorney, Agent, or Firm—Burns, Doane, Swecker & Mathis, L.L.P.

[57] ABSTRACT

A method and device are provided for controlling an activity mode of a mobile station after the system has originated or terminated a transaction with the mobile station. The activity mode corresponds to whether the mobile station stays "awake" or goes into a sleep mode, which must be made known to the system. If the mobile station does not immediately go to the sleep mode, the base station can expect the mobile station to be reading all slots. If the mobile station is in the sleep mode, the mobile station only reads its assigned paging slots. The mobile station may not go to the sleep mode until a selected amount of activity time has expired; during the activity time, the mobile station continues to read all slots. As a result, the mobile station can immediately receive packets, thereby saving set-up time which increases the response time of the mobile station.

6 Claims, 9 Drawing Sheets

ACTIVITY CONTROL FOR A MOBILE STATION IN A WIRELESS COMMUNICATION SYSTEM

BACKGROUND

Applicants' invention relates to electrical telecommunication, and more particularly to wireless communication systems, such as cellular and satellite radio systems, for various modes of operation (analog, digital, dual mode, etc.), and access techniques such as frequency division multiple access (FDMA), time division multiple access (TDMA), code division multiple access (CDMA), and hybrid FDMA/TDMA/CDMA. The specific aspects of the invention are directed to techniques for enhancing procedures for reception and transmission of information.

A description follows which is directed to environments in which this invention may be applied. This general description is intended to provide a general overview of known systems and associated terminology so that a better understanding of the invention can be obtained.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association (TIA/EIA), which publication is expressly incorporated here by reference. Because of a large existing consumer base of equipment operating only in the analog domain with frequency-division multiple access (FDMA), TIA/EIA/IS-54-B is a dual-mode (analog and digital) standard, providing for analog compatibility together with digital communication capability. For example, the TIA/EIA/IS-54-B standard provides for both FDMA analog voice channels (AVC) and TDMA digital traffic channels (DTC). The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCs) can also be provided for communicating control signals, and such a DCC is a logical channel formed by a succession of usually non-consecutive time slots on the radio carrier.

In only one of many possible embodiments of a TDMA system as described above, the TIA/EIA/IS-54-B standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54-B, each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving.

In addition to voice or traffic channels, cellular radio communication systems also provide paging/access, or control, channels for carrying call-setup messages between base stations and mobile stations. According to TIA/EIA/IS-54-B, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in a TIA/EIA/IS-54-B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

The performance of the system having ACCs that is specified by TIA/EIA/IS-54-B has been improved in a system having digital control channels (DCCHs) that is specified in TIA/EIA/IS-136, the disclosure of which is expressly incorporated here by reference. Using such DCCHs, each TIA/EIA/IS-54-B radio channel can carry DTCs only, DCCHs only, or a mixture of both DTCs and DCCHs. Within the TIA/EIA/IS-136-B framework, each radio carrier frequency can have up to three full-rate DTCs/DCCHs, or six half-rate DTCs/DCCHs, or any combination in between, for example, one full-rate and four half-rate DTCs/DCCs.

In general, however, the transmission rate of the DCCH need not coincide with the half-rate and full-rate specified in TIA/EIA/IS-54-B, and the length of the DCC slots may not be uniform and may not coincide with the length of the DTC slots. The DCCH may be defined on an TIA/EIA/IS-54-B radio channel and may consist, for example, of every n-th slot in the stream of consecutive TDMA slots. In this case, the length of each DCCH slot may or may not be equal to 6.67 msec, which is the length of a DTC slot according to TIA/EIA/IS-54-B. Alternatively (and without limitation on other possible alternatives), these DCCH slots may be defined in other ways known to one skilled in the art.

In cellular telephone systems, an air link protocol is required in order to allow a mobile station to communicate with the base stations and MSC. The communications link protocol is used to initiate and to receive cellular telephone calls. The communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Communications between mobile stations and the cellular switching system (the base stations and the MSC) can be described in general with reference to FIGS. 1, 2(a), and 2(b). FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an TIA/EIA/136 carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2(a) and as described above in connection with the TIA/EIA/IS-136 standard.

FIG. 2(a) shows a general example of a forward (or downlink) DCCH configured as a succession of time slots 1, 2, . . . , N, . . . included in the consecutive time slots 1, 2, . . . sent on a carrier frequency. These DCCH slots may be defined on a radio channel such as that specified by TIA/EIA/IS-136, and may consist, as seen in FIG. 2(a) for example, of every n-th slot in a series of consecutive slots. Each DCCH slot has a duration that may or may not be 6.67 msec, which is the length of a DTC slot according to the TIA/EIA/IS-136 standard.

As shown in FIG. 2(a), the DCCH slots may be organized into superframes (SF), and each superframe includes a number of logical channels that carry different kinds of information. One or more DCCH slots may be allocated to each logical channel in the superframe. The exemplary downlink superframe in FIG. 2(a) includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2(a) may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

FIG. 2(b) illustrates a preferred information format for the slots of a forward DCCH. The invention transmitted in each slot comprises a plurality of fields, and FIG. 2(b) indicates the number of bits in each field above that field. The bits sent in the SYNC field are used in a conventional way to help ensure accurate reception of the coded superframe phase (CSFP) and DATA fields. The SYNC field includes a predetermined bit pattern used by the base stations to find the start of the slot. The shared channel feedback (SCF) field is used to control a random access channel (RACH), which is used by the mobile to request access to the system. The CSFP field conveys a coded superframe phase value that enables the mobile stations to find the start of each superframe. This is just one example for the information format in the slots of the forward DCCH.

For purposes of efficient sleep mode operation and fast cell selection, the BCCH may be divided into a number of sub-channels. A BCCH structure is known that allows the mobile station to read a minimum amount of information when it is switched on (when it locks onto a DCCH) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message must be carried using as many TDMA channel bursts as required to send the entire Layer 3 message.

Digital control and traffic channels are desirable for reasons, such as supporting longer sleep periods for the mobile units, which results in longer battery life.

Digital traffic channels and digital control channels have expanded functionality for optimizing system capacity and supporting hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas along city streets, and picocells 40, 50, and 60, which cover individual floors of a building. The intersection of the two city streets covered by the microcells 20 and 30 may be an area of dense traffic concentration, and thus might represent a hot spot.

FIG. 4 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System, " which is incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCHs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

To increase the user's "talk time", i.e., the battery life of the mobile station, a digital forward control channel (base station to mobile station) may be provided that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

The systems specified by the TIA/EIA/IS-54-B and TIA/EIA/IS-136 standards are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks are usually designed and based on industry-wide data standards such as the open system interface (OSI) model or the TCP/IP protocol stack. These standards have been developed, whether formally or de facto, for many years, and the applications that use these protocols are readily available. The main objective of standards-based networks is to achieve interconnectivity with other networks. The Internet is today's most obvious example of such a standards-based network pursuit of this goal.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

A few exceptions to data services for cellular systems based on the circuit-switched mode of operation are described in the following documents, which include the packet data concepts.

U.S. Pat. No. 4,887,265 and "Packet Switching in Digital Cellular Systems", Proc. 38th IEEE Vehicular Technology Conf., pp. 414–418 (June 1988) describe a cellular system providing shared packet data radio channels, each one capable of accommodating multiple data calls. A mobile station requesting packet data service is assigned to a particular packet data channel using essentially regular cellular signalling. The system may include packet access points (PAPS) for interfacing with packet data networks. Each packet data radio channel is connected to one particular PAP and is thus capable of multiplexing data calls associated with that PAP. Handovers are initiated by the system in a manner that is largely similar to the handover used in the same system for voice calls. A new type of handover is added for those situations when the capacity of a packet channel is insufficient.

These documents are data-call oriented and based on using system-initiated handover in a similar way as for regular voice calls. Applying these principles for providing general purpose packet data services in a TDMA cellular system would result in spectrum-efficiency and performance disadvantages.

U.S. Pat. No. 4,916,691 describes a new packet mode cellular radio system architecture and a new procedure for routing (voice and/or data) packets to a mobile station. Base stations, public switches via trunk interface units, and a cellular control unit are linked together via a WAN. The routing procedure is based on mobile-station-initiated handovers and on adding to the header of any packet transmitted from a mobile station (during a call) an identifier of the base station through which the packet passes. In case of an extended period of time between subsequent user information packets from a mobile station, the mobile station may transmit extra control packets for the purpose of conveying cell location information.

The cellular control unit is primarily involved at call establishmnent, when it assigns to the call a call control number. It then notifies the mobile station of the call control number and the trunk interface unit of the call control number and the identifier of the initial base station. During a call, packets are then routed directly between the trunk interface unit and the currently serving base station.

The system described in U.S. Pat. No. 4,916,691 is not directly related to the specific problems of providing packet data services in TDMA cellular systems.

"Packet Radio in GSM", European Telecommunications Standards Institute (ETSI) T Doc SMG 4 58/93 (Feb. 12, 1993) and "A General Packet Radio Service Proposed for GSM" presented during a seminar entitled "GSM in a Future Competitive Environment", Helsinki, Finland (Oct. 13, 1993) outline a possible packet access protocol for voice and data in GSM. These documents directly relate to TDMA cellular systems, i.e., GSM, and although they outline a possible organization of an optimized shared packet data channel, they do not deal with the aspects of integrating packet data channels in a total system solution.

"Packet Data over GSM Network", T Doc SMG 1 238/93, ETSI (Sept. 28, 1993) describes a concept of providing packet data services in GSM based on first using regular GSM signalling and authentication to establish a virtual channel between a packet mobile station and an "agent" handling access to packet data services. With regular signalling modified for fast channel setup and release, regular traffic channels are then used for packet transfer. This document directly relates to TDMA cellular systems, but since the concept is based on using a "fast switching" version of existing GSM traffic channels, it has disadvantages in terms of spectrum efficiency and packet transfer delays (especially for short messages) compared to a concept based on optimized shared packet data channels.

Cellular Digital Packet Data (CDPD) System Specification, Release 1.0 (July 1993), the disclosure of which is expressly incorporated here by reference, describes a concept for providing packet data services that utilizes available radio channels on current Advanced Mobile Phone Service (AMPS) systems, i.e., the North American analog cellular system. CDPD is a comprehensive, open specification endorsed by a group of U.S. cellular operators. Items covered include external interfaces, air link interfaces, services, network architecture, network management, and administration.

The specified CDPD system is to a large extent based on an infrastructure that is independent of the existing AMPS infrastructure. Commonalities with AMPS systems are limited to utilization of the same type of radio frequency channels and the same base station sites (the base station used by CDPD may be new and CDPD specific) and employment of a signalling interface for coordinating channel assignments between the two systems.

Routing a packet to a mobile station is based on, first, routing the packet to a home network node (home Mobile Data Intermediate System, MD-IS) equipped with a home location register (HLR) based on the mobile station address; then, when necessary, routing the packet to a visited, serving MD-IS based on HLR information; and finally transferring the packet from the serving MD-IS via the current base station, based on the mobile station reporting its cell location to its serving MD-IS.

Although the CDPD System Specification is not directly related to the specific problems of providing packet data services in TDMA cellular systems that are addressed by this application, the network aspects and concepts described in the CDPD System Specification can be used as a basis for the network aspects needed for an air link protocol in accordance with this invention.

The CDPD network is designed to be an extension of existing data communications networks and the AMPS cellular network. Existing connectionless network protocols may be used to access the CDPD network. Since the network is always considered to be evolving, it uses an open network design that allows the addition of new network layer protocols when appropriate. The CDPD network services and protocols are limited to the Network Layer of the OSI model and below. Doing so allows upper-layer protocols and applications development without changing the underlying CDPD network.

From the mobile subscriber's perspective, the CDPD network is a wireless mobile extension of traditional networks, both data and voice. By using a CDPD service provider network's service, the subscriber is able seamlessly to access data applications, many of which may reside on traditional data networks. The CDPD system may be viewed as two interrelated service sets: CDPD network support services and CDPD network services.

CDPD network support services perform duties necessary to maintain and administer the CDPD network. These services are: accounting server; network management system; message transfer server; and authentication server. These services are defined to permit interoperability among service providers. As the CDPD network evolves technically beyond its original AMPS infrastructure, it is anticipated that the support services shall remain unchanged. The functions of network support services are necessary for any mobile network and are independent of radio frequency (RF) technology.

CDPD network services are data transfer services that allow subscribers to communicate with data applications. Additionally, one or both ends of the data communication may be mobile.

To summarize, there is a need for a system providing general purpose packet data services in D-AMPS cellular systems, based on providing shared packet-data channels optimized for packet data. This application is directed to systems and methods that provide the combined advantages of a connection-oriented network like that specified by the TIA/EIA/IS-136 standard and a connectionless, packet data network. Furthermore, this invention is directed to accessing the CDPD network.

SUMMARY

In accordance with one aspect of the invention, there is provided a method for controlling an activity mode of a mobile station after the system has originated or terminated a transaction with the mobile station. The activity mode corresponds to whether the mobile station stays "awake" or goes into a sleep mode, which must be made known to the system. If the mobile station does not immediately go to the sleep mode, the base station can expect the mobile station to be reading all slots. If the mobile station is in the sleep mode, the mobile station only reads its assigned paging slots. The mobile station may not go to the sleep mode until a selected amount of activity time has expired; during the activity time, the mobile station continues to read all slots. As a result, the mobile station can immediately receive packets, thereby saving set-up time which increases the response time of the mobile station.

BRIEF DESCRIPTION OF THE DRAWINGS

The features and advantages of Applicants' invention will be understood by reading this description in conjunction with the drawings in which.

DETAILED DESCRIPTION

This invention is directed to implementing protocols and procedures for connectionless communication between the mobile station and a base station. In particular, the invention is directed to an air interface protocol and the associated mobile station procedures required for packet data that are based on IS-136. The protocol and procedures for one aspect of this invention resemble the digital control channel (DCCH) operation of IS-136 because IS-136 was designed to provide, for example, connectionless transmission of a point-to-point short message service on the DCCH. Based on this fact, the IS-136 protocol and procedures have been expanded to support packet-oriented services in embodiments of Applicants' invention. More generally, the invention is directed to communication between a base station and network entities using any standardized or proprietary packet network or using a connection-oriented protocol because no assumptions have been made about the network.

The network aspect of the CDPD specification is one example that can be used in implementing this invention.

In order to maximize the flexibility of performance characteristics and be able to tailor terminal implementation for specific applications in specific embodiments of the invention, several bandwidth allocations are provided. One such bandwidth allocation is hosted PDCH, which is an added logical subchannel on the IS-136 digital control channel. The hosted PDCH allows a minimal implementation effort but provides limited throughput rate. Three other bandwidth allocations provided on the dedicated PDCH are full-rate PDCH, double-rate PDCH and triple-rate PDCH. A PDCH can be mixed with IS-136 DCCHs and DTCs on the same carrier up to the rate limit corresponding to three full-rate channels. Some of these aspects are described in U.S. patent application Ser. No. 08/544,493, entitled "A Method For Compensating Time Dispersion In A Communication System" to Krister Raith, filed on Oct. 18, 1995, the disclosure of which is expressly incorporated here by reference.

The protocol and procedures for connectionless communication between mobile stations and base stations in accordance with this invention are directed to maximizing performance characteristics. Other desirable expansions of functionality by this invention include introducing PDCH paging areas and registration, as per IS-136 for example, providing the option to send Layer 3 messages defined for connectionless communication on a connection-oriented DTC, providing for IS-136 paging indicators while on the PDCH and providing for dedicated PDCH notification while on a DTC. One possible set of specific protocol and procedures for enhancing aspects of various connectionless communication between mobile stations and base stations is discussed below.

Figure 1:
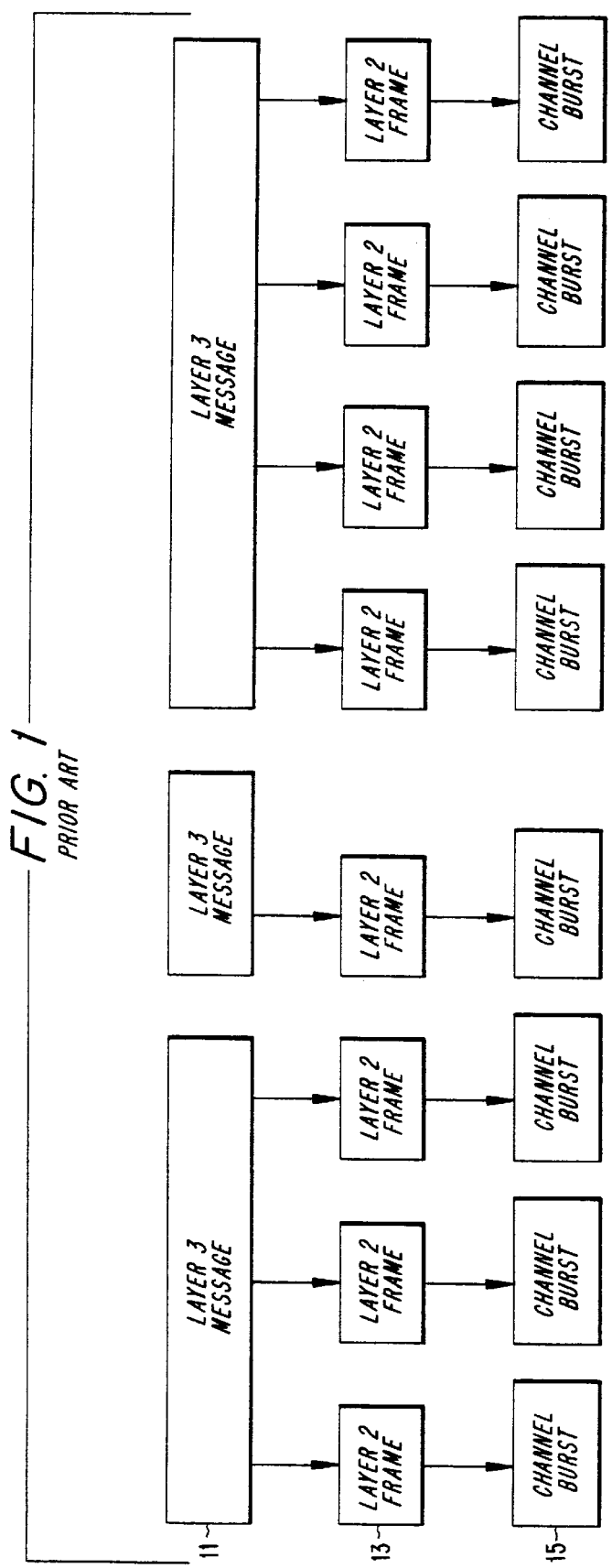
FIG. 1 schematically illustrates pluralities of Layer 3 messages, Layer 2 frames, and Layer 1 channel bursts, or time slots.
Figure 2:
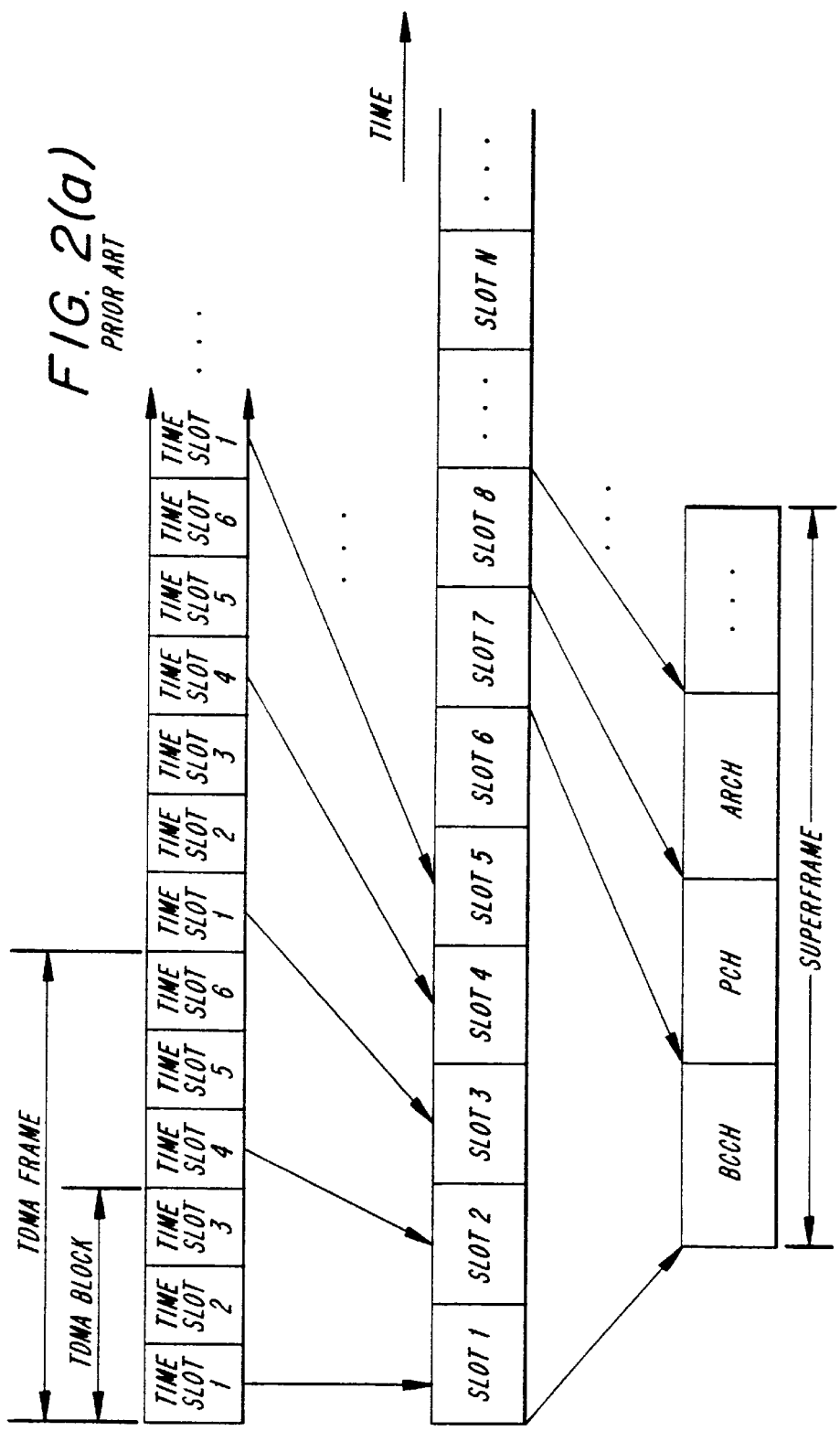
FIG. 2(a) shows a forward DCC configured as a succession of time slots included in the consecutive time slots sent on a carrier frequency.
FIG. 2(b) shows an example of an IS-136 DCCH field slot format.
Figure 3:
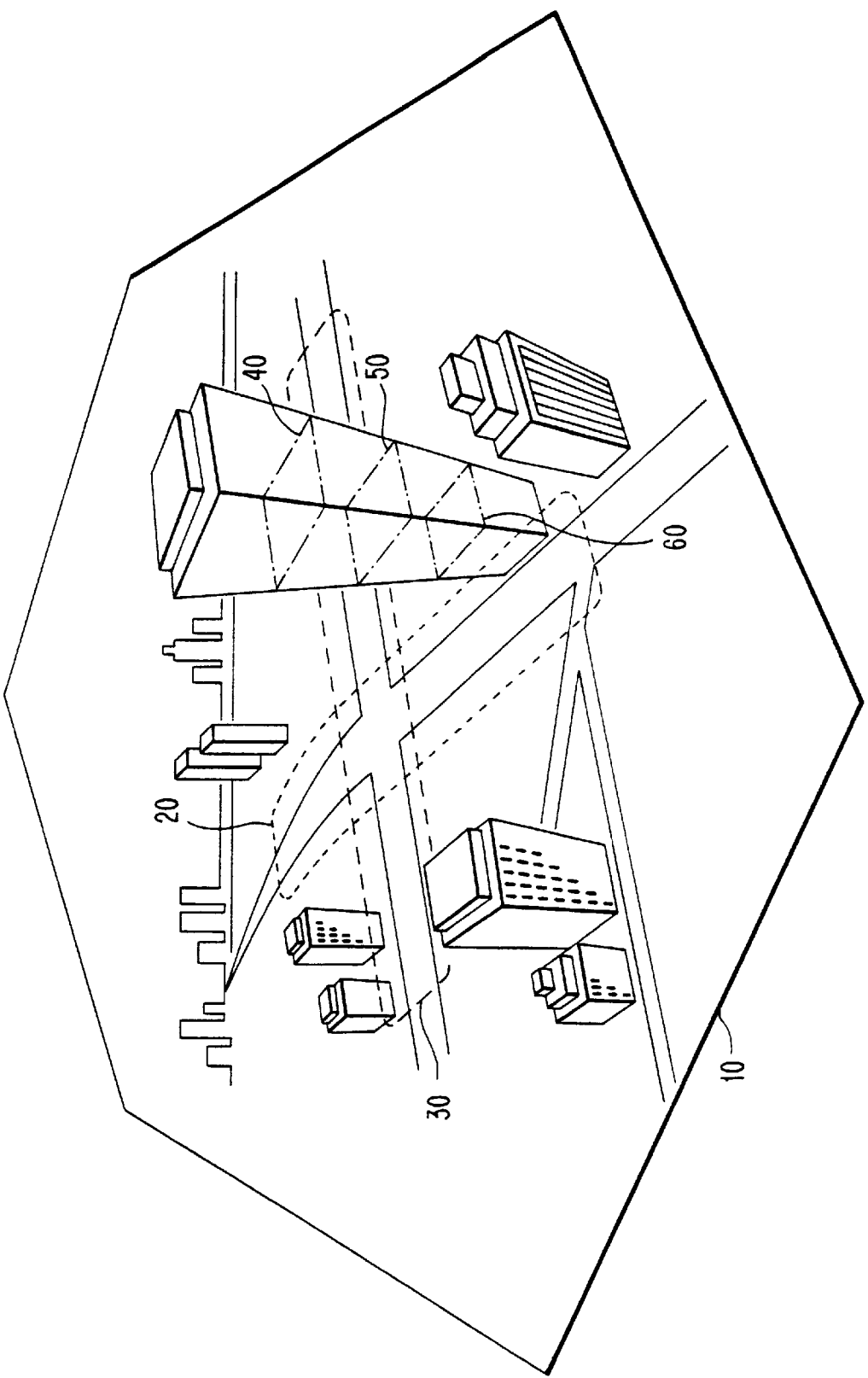
FIG. 3 illustrates an exemplary hierarchical, or multi-layered, cellular system.
Figure 4:
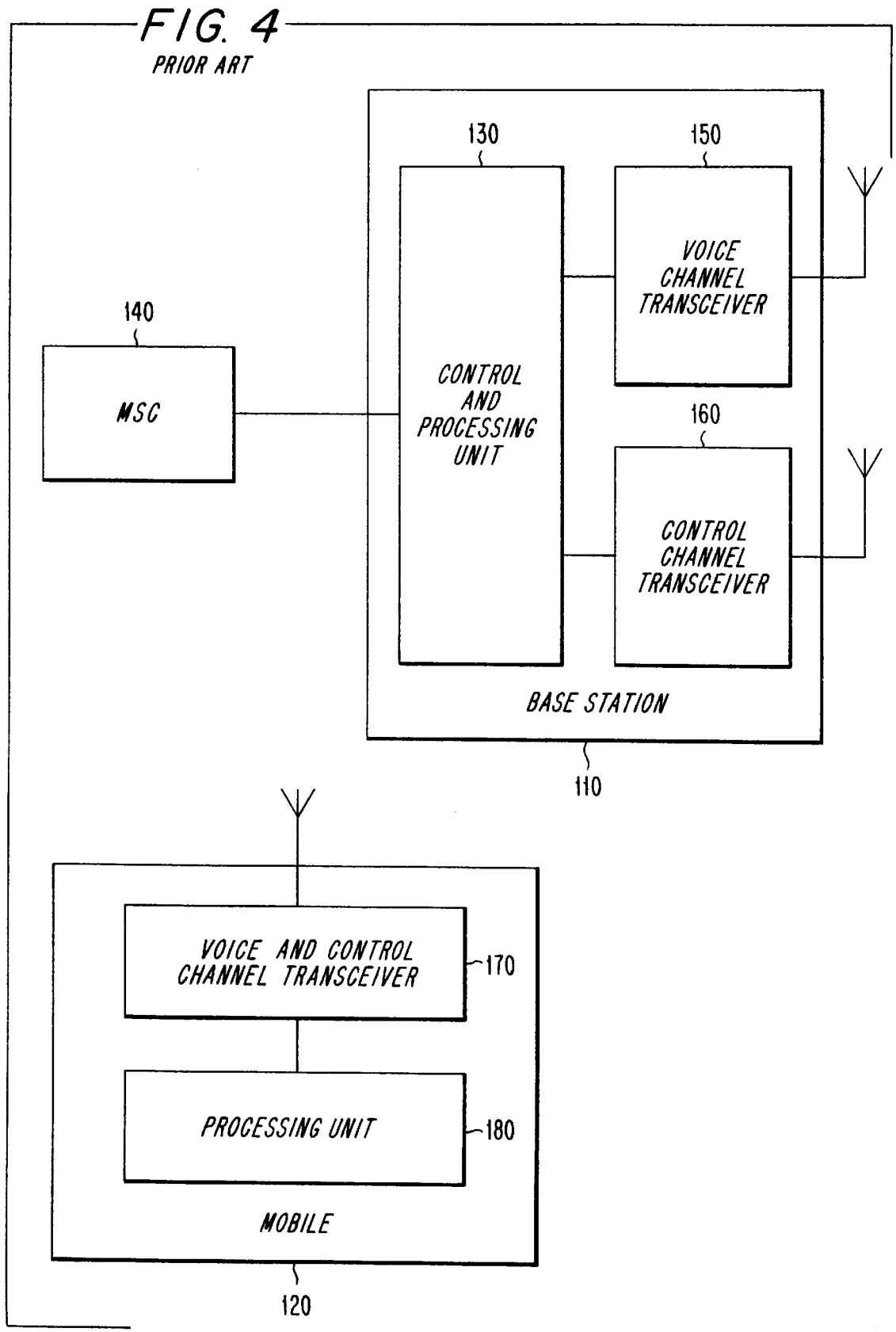
FIG. 4 is a block diagram of an exemplary cellular mobile radiotelephone system, including an exemplary base station and mobile station.
Figure 5:
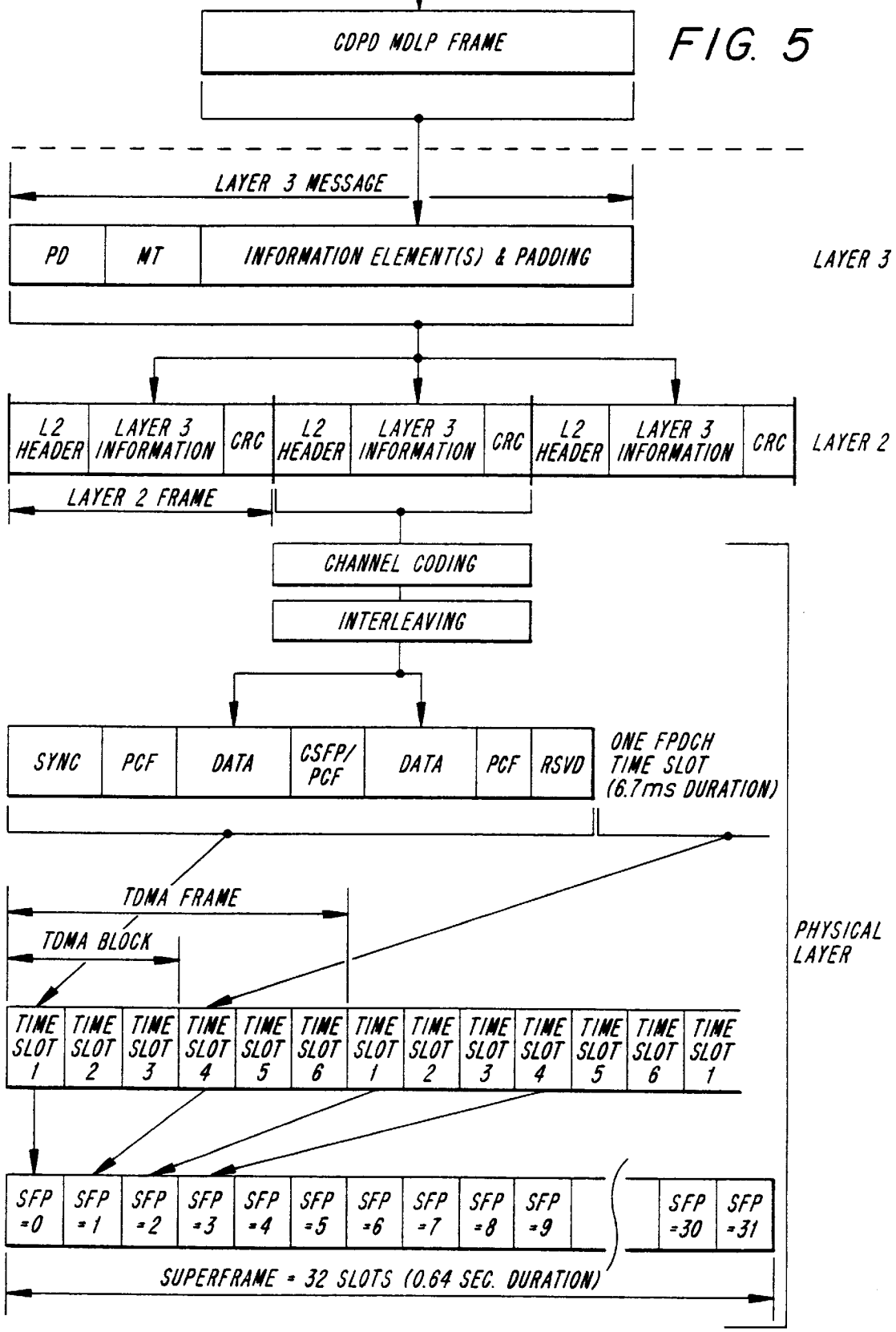
FIG. 5 illustrates one example of a possible mapping sequence.

To aid in understanding, one possible mapping sequence is illustrated in FIG. 5, which shows a dedicated PDCH example of how a Layer 3 message is mapped into several Layer 2 frames, an example of a Layer 2 frame mapping onto an FDPCH time slot, and an example of time slot mapping onto a PDCH channel. The length of the forward PDCH (FPDCH) time slots and reverse PDCH (RPDCH) bursts are fixed, although there may be three forms of RPDCH bursts which have different fixed lengths. The FPDCH slot and the full-rate PDCH are assumed to be on the physical layer in FIG. 5. In the present invention, the TDMA frame structure is the same as for the IS-136 DCCH and DTC. In the interest of maximal throughput when a multi-rate channel is used (double-rate PDCH and triple-rate PDCH), an additional FPDCH slot format is specified. For more details regarding this exemplary physical layer structure, the interested reader is directed to U.S. patent application Ser. No. 08/544,489, entitled "A Method For Increasing Throughput Capacity In A Communication System" to Raith et al., which application was filed on Oct. 18, 1995, the disclosure of which is incorporated here by reference. As will be appreciated by those skilled in the art, this exemplary air interface protocol permits multi-mode terminal operating which will now be described, by virtue of its flexible mapping of both packet data and voice protocols.

Figure 6A:
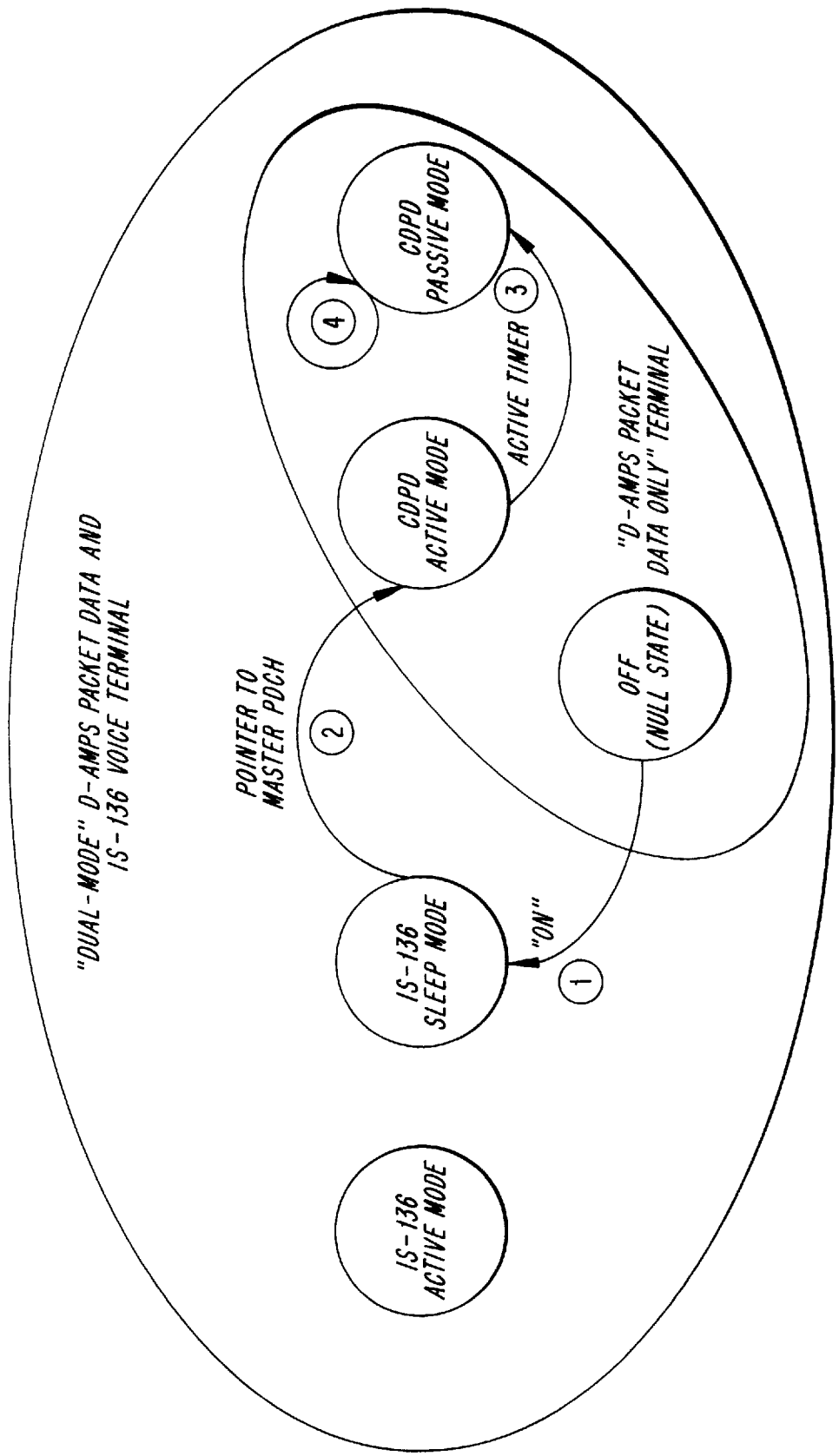
FIGS. 6(a)–6(c) illustrate examples of mobile station functional modes.

FIG. 6(a) illustrates the mobile station activated as a packet only terminal. FIG. 6(a) illustrates one example where the PDCH-only mode of operation is activated by the mobile station first finding a DCCH and reading the BCCH to find the pointer to the beacon PDCH (step 1). A discussion of beacon PDCHs, generally, can be found in U.S. patent application Ser. No. 08/544,488, entitled "A Method For System Registration and Cell Reselection" to Raith et al., which was filed on Oct. 18, 1995, and which disclosure is expressly incorporated here by reference. The mobile station does not register itself on the DCCH at this time. Once the mobile station is locked to the beacon PDCH, the mobile station enters an active mode and registers itself as represented by step 2. The mobile station may be redirected to a different PDCH (e.g., by a pointer to a Master PDCH as indicated in FIG. 6(a)) as a result of the system's response to its registration. The mobile station stays in an active mode where it reads all of the time slots on its assigned PDCH until an activity timer has expired as represented by step 3. The mobile station then enters a passive or sleep mode where less than all of the time slots are read as represented by step 4. In this way, the mobile station is activated as a packet-only terminal at registration.

Figure 6B:
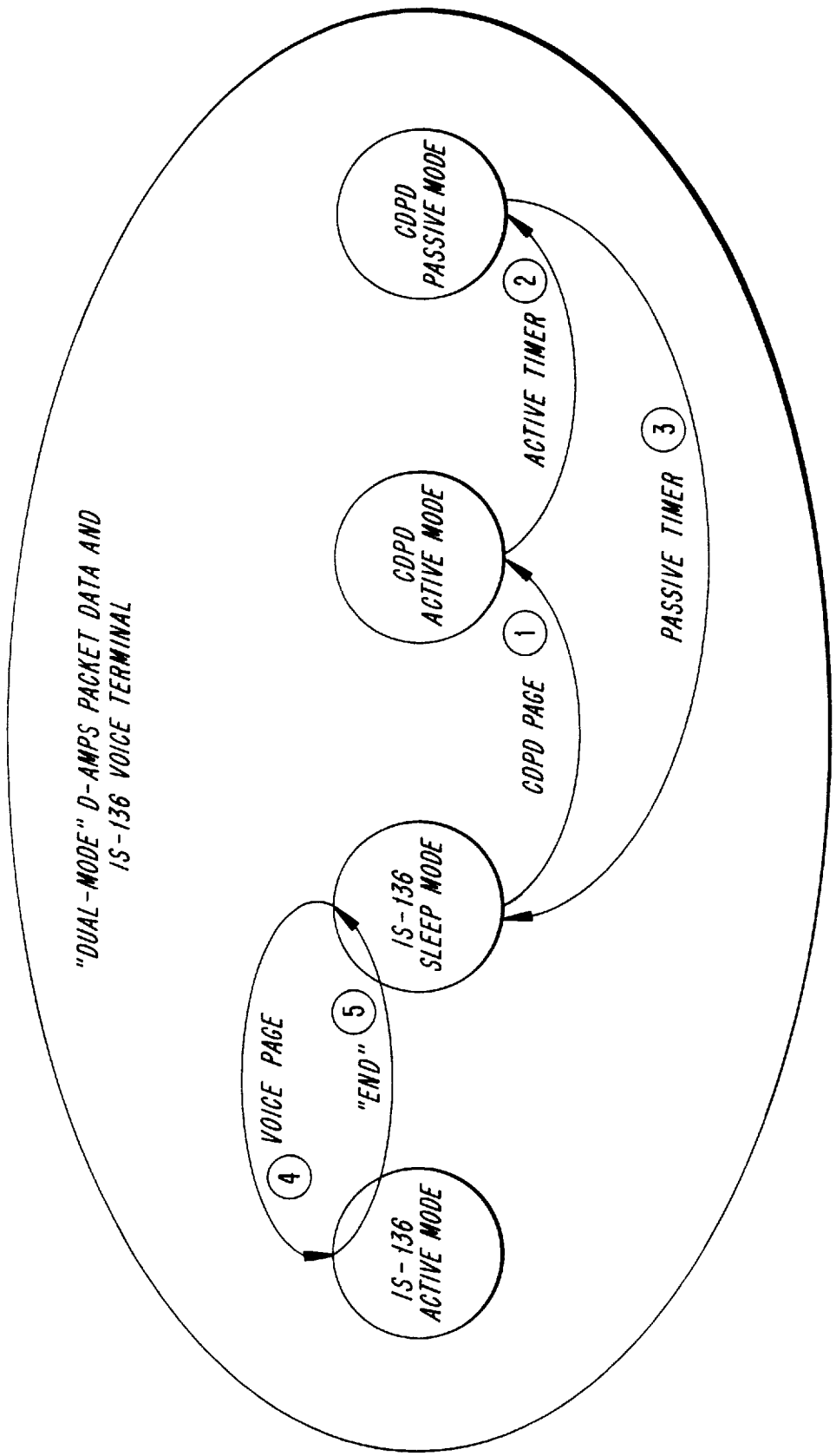

FIG. 6(b) illustrates an example of a mobile station which has registered in both D-AMPS and PDCH modes of operation, where the default mode is D-AMPS. FIG. 6(b) is directed to a sequence of events which includes both a PDCH page and D-AMPS page. When the mobile station is in an IS-136 sleep mode and a page message is received that indicates a terminating PDCH transaction, i.e., a packet data transaction is being initiated, the mobile station moves from the DCCH to its previously assigned PDCH and enters an active mode as represented by step 1 of FIG. 6(b). After the PDCH transaction is completed and an active timer has expired, the mobile station enters a passive mode as represented at step 2. After a second (passive) timer expires while in the passive mode, the mobile station returns to the initial DCCH as represented by step 3. When the mobile station is in an IS-136 sleep mode and a page is received that indicates a terminating D-AMPS transaction, e.g., a voice call is being initiated with that mobile, the mobile station is assigned a traffic channel for the voice call as represented by step 4. After completion of the voice call, the mobile station returns to the IS-136 sleep mode as represented by step 5. It will be seen that these steps allow the mobile station to be paged as either a voice and packet data terminal.

Figure 6C:
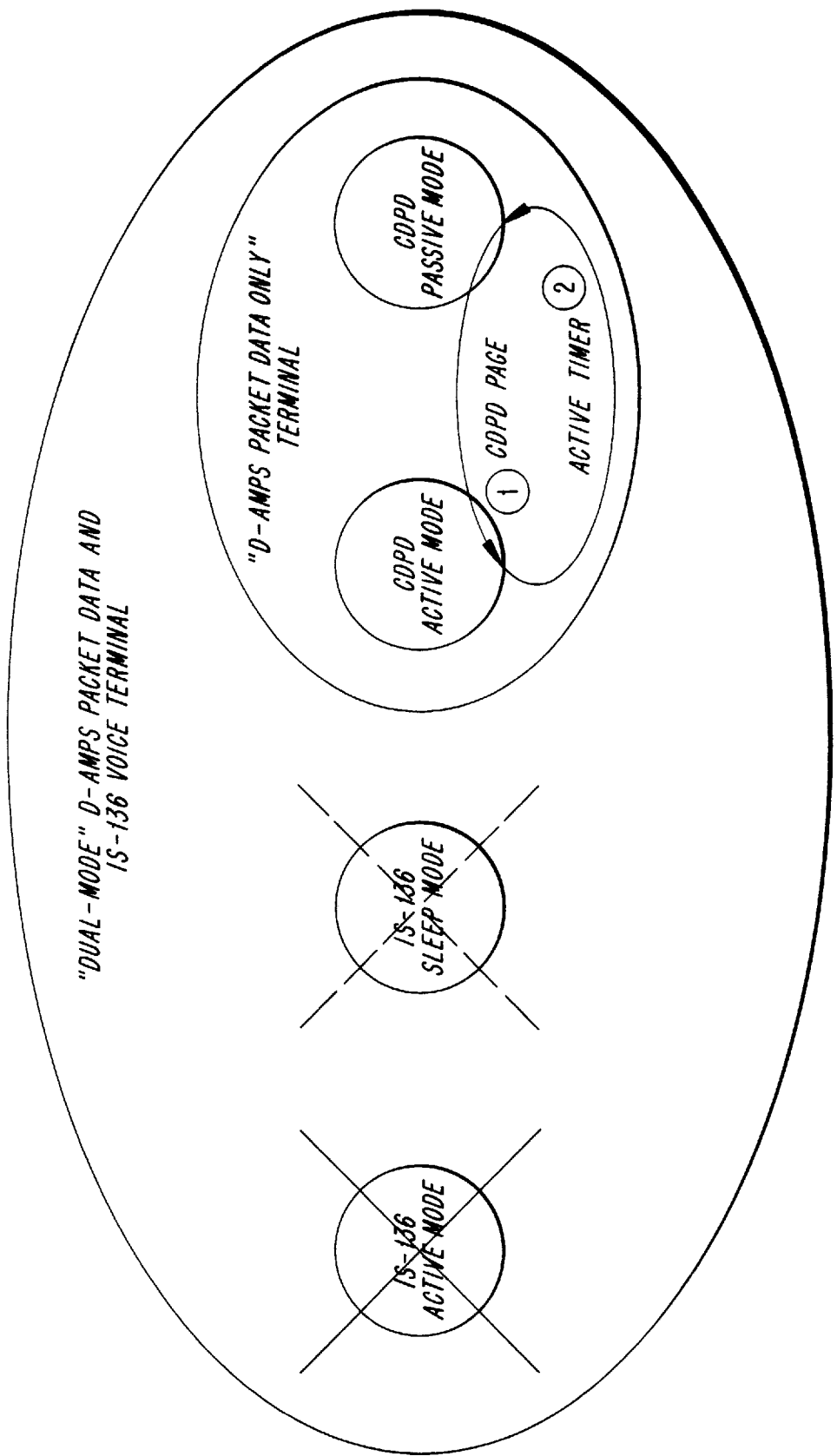

An example of a mobile station paged as a packet-only terminal is illustrated in FIG. 6(c). As represented at step 1 of FIG. 6(c), a page message is received that indicates a terminating PDCH transaction. After the terminating PDCH transaction is completed and an inactivity timer expires, the mobile station enters a passive mode as represented by step 2. Since the IS-136 active mode is not used by a packet data-only terminal, this mode is unused as indicated in FIG. 6(c). The terminal still has the ability to read the BCCH on the IS-136 DCCH, as indicated in FIG. 6(c). For example, overhead information found on the BCCH can be used as described in U.S. patent application Ser. No. 08/544,839, entitled "Registration Control of Mobile Stations In A Wireless Communication System" to Diachina et al., filed on Oct. 18, 1995, the disclosure of which is incorporated here by reference. In this way, the mobile station functions as a packet data-only terminal.

In an aspect of the invention, a method is provided which allows the mobile station to achieve a fast response time to received commands and data. An activity mode control for the mobile station is provided in one embodiment. More particularly, in a transaction, such as a registration message, the mobile station informs the system of its intended mode of operation. In one mode of operation, e.g., packet data mode, the mobile station is placed in an activity mode for a predetermined amount of activity time and during this activity time, the mobile station is kept awake for a mobile user selectable period. During this period, the mobile station reads all of the time slots in the superframe except for the broadcast time slots. As a result, the mobile station has a faster response to received higher application layer data and the amount of set-up time is reduced but more power is consumed since the mobile station reads more than just its assigned paging slots.

Figure 7:
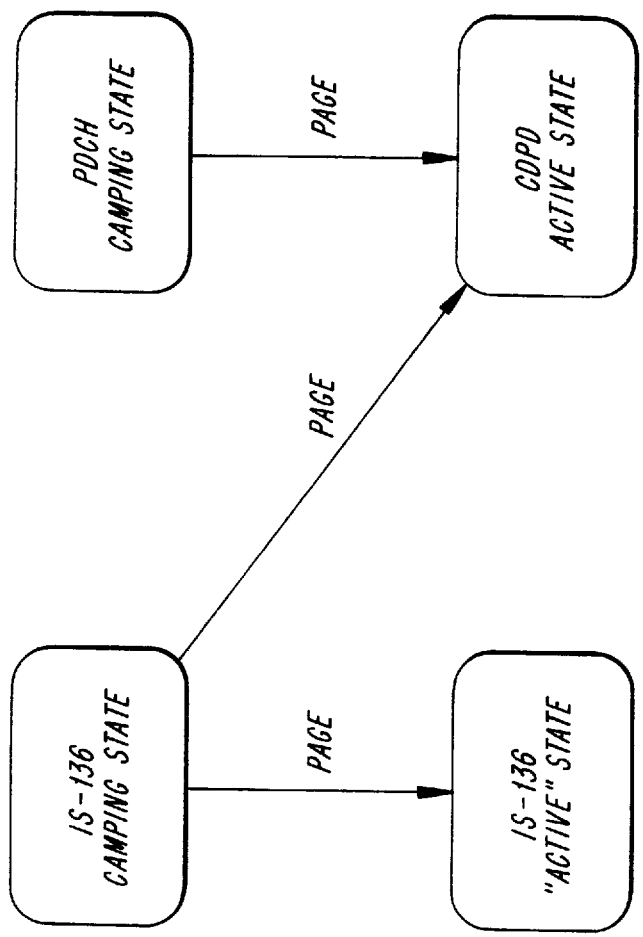
FIG. 7 illustrates an example of intra-mode and inter-mode paging.

FIG. 7 further illustrates possible intermode and intra-mode paging events. The IS-136 active state represents all IS-136 states in which the mobile station is in the process of receiving or transmitting point-to-point messages (via DCCH or DTC). While camped on the IS-136 control channel, the mobile station may be given an indication (paged) about a terminating packet data transaction or about a terminating IS-136 transaction. Conversely, if the mobile station is in a packet state, the mobile station may be paged regarding a terminating IS-136 transaction.

To provide fast response times, it is desirable to stay awake and read all of the time slots; however, this is not an efficient use of mobile power. Therefore, staying awake for a predetermined time, which is set by an activity timer, before going to a sleep mode helps achieve an effective balance of fast response time and minimized power consumption. The system must know that the mobile station is in an activity mode where all of the time slots are being read and may be accessed in any time slot so that the system does not have to wait to send the message in the assigned paging time slot. One way to handle this is an IS-136 mode wherein the mobile station and the base station keep each other informed, by a registration message, for example. After receiving a complete Layer 3 message, the mobile station may be set to stay awake for one minute, for example, during which all of the time slots are read and can be used to access the mobile. After this time period, the mobile's assigned paging slot must be used (i.e., the mobile station enters the sleep mode). Then, after nine more minutes, for example, the mobile station may return to the PDCH.

In another example, to address the amount of power consumption that results when the mobile station reads more than the minimum number of slots, the mobile station may be set to return to a sleep mode on the DCCH for another user selectable amount of time by an inactivity timer after the activity timer expires. After the inactivity timer expires and the D-AMPS mode is activated, the mobile station returns to the mother DCCH and enters the DCCH camping state. Of course, the system must know whether the mobile station is camped on the DCCH or the PDCH. If the mobile station is camped on the PDCH, two states are possible. One state is the sleep mode where one time slot is read during every superframe. However, the sleep mode is not conducive to providing fast response times by the mobile station.

One advantage provided by this invention is an enhanced dual mode operation, such as dual operation in voice and data modes. By returning to the mother DCCH and entering the DCCH camping state, if voice transactions have priority over data transactions in a voice/data dual mode operation, voice transactions can be received faster. Another advantage of this invention is provided in conditions where the provisions for inter-mode paging are limited. To prevent the network from becoming too complex, the provisions for inter-mode paging may be limited. To accomplish paging if only a limited set of states provides for inter-mode paging, the mobile station moves to the most common state in this invention. In FIG. 7 for instance, if the mobile station is in PDCH passive state, inter-mode paging from IS-136 cannot be accomplished. By returning to the mother DCCH and entering the DCCH camping state, either mode can be paged.

A still further advantage provided by this invention is that more sleep mode classes may be provided by the DCCH than by the PDCH. By entering the DCCH camping state, it is possible to set the mobile station in a sleep mode where power consumption is reduced as much as possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling readiness levels including an awake mode and a sleep mode of a mobile station in a wireless communication system, comprising the steps of:

(a) changing the readiness level in which the mobile station is operating from a first readiness level to a second readiness level in response to the expiration of at least one timer having a period which is variable substantially independent of communication system operation requirements; and (b) determining, at the system, the readiness level of the mobile station, wherein the mobile station reads substantially all time slots for a first predetermined time during said awake mode and the mobile station reads assigned paging slots during said sleep mode.

2. A method according to claim 1, further comprising the step of returning to a digital control channel (DCCH) after said second predetermined time and entering a DCCH sleep mode on said DCCH.

3. The method of claim 1, wherein the at least one timer has a period selectable by an individual mobile station user.

4. A system for controlling readiness levels including an awake mode and a sleep mode of a mobile station in a wireless communication system, comprising:

means for changing the readiness level in which the mobile station is operating from a first readiness level to a second readiness level in response to the expiration of at least one timer having a period which is variable substantially independent of communication system operation requirements; and means for informing the system of the readiness level of the mobile station, wherein the mobile station reads substantially all time slots for a first predetermined time during said awake mode and the mobile station reads assigned paging slots during said sleep mode for a second predetermined time after said first predetermined time of a packet data channel.

5. A system according to claim 4, further comprising means for returning to a digital control channel (DCCH) after said second predetermined time and entering a DCCH sleep mode on said DCCH.

6. The system of claim 4, wherein the at least one timer has a period selectable by an individual mobile station user.

* * * * *